Sept. 7, 1937.  C. R. WASEIGE  2,092,565
CHARGE FORMING MECHANISM FOR INTERNAL COMBUSTION ENGINES
Filed July 14, 1934
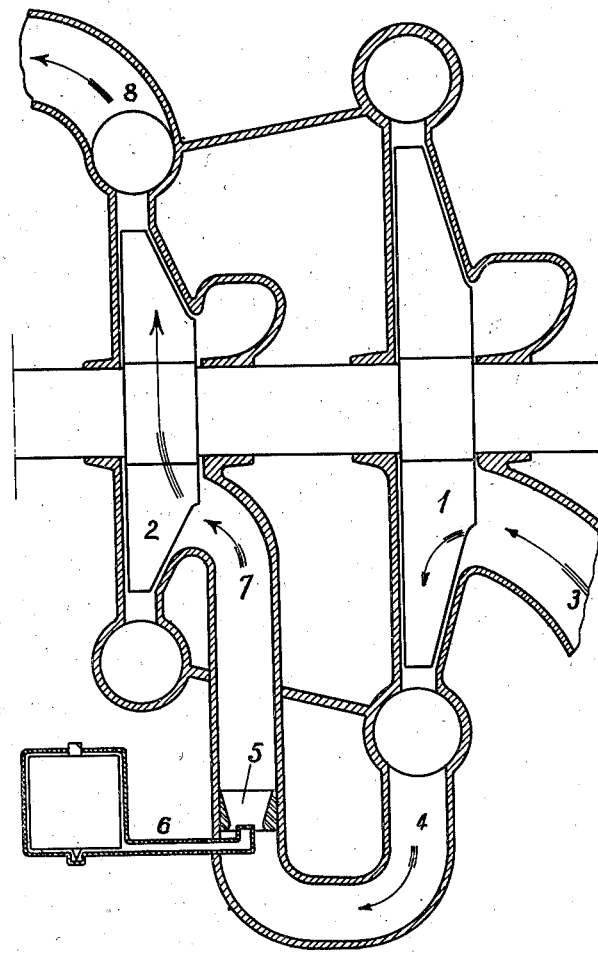
INVENTOR.
Charles Raymond Waseige
BY Warren T. Hunt
ATTORNEY.

Patented Sept. 7, 1937

2,092,565

UNITED STATES PATENT OFFICE 2,092,565

CHARGE FORMING MECHANISM FOR INTERNAL COMBUSTION ENGINES

Charles Raymond Waseige, Rueil-Malmaison, France, assignor to Eclipse Aviation Corporation, East Orange, N. J., a corporation of New Jersey Application July 14, 1934, Serial No. 735,264
In France August 30, 1933

2 Claims. (Cl. 123—119)

The invention relates to a charge forming mechanism for internal combustion engines, but more specifically to a two stage compressor wherein a charge of combustible is designed to be introduced between the stages.

With respect to the supercharging of engines there are generally two positions of the carburetor either in front of or in back of the compressor. Each of these two solutions present certain advantages and inconveniences and their utilization depends upon the particular installation envisaged.

In certain cases when utilization is made of a single carburetor in conjunction with a plurality of cylinders, it is indispensable to make use of the rotor of the compressor for the purpose of mixing the charge in order to have as perfect as possible an atomization of the mixture of combustible and air. The carburetor is then placed ahead of the compressor. While this solution of the problem is quite current, nevertheless it does present the inconvenience that one is obliged to heat the carburetor in order to avoid its freezing or the formation of frost thereon.

When the carburetor is placed after the compressor, i. e. between the compressor and the engine, obviously, since the air is heated during the compression, the carburetor need not be warmed, but on the other hand, the mixture of combustible and air is not worked upon and thoroughly atomized by the compressor rotor.

Where a rather high degree of supercharging is required, it is sometimes necessary to make use of two stages of compression.

The present invention is directed to an installation embodying a two stage compressor wherein the carburetor or some means for providing the injection of a combustible is placed between the two stages of compression.

As a result of this disposition of the elements the second compressor rotor insures an efficient mixing and atomization of the charge while the first rotor, through the elevation of the temperature of the incoming air, permits the omission altogether of heating mechanism for the carburetor.

This arrangement of the elements presents also the advantage of giving a final charge which at the entry to the cylinder has a temperature less than if the carburetor was placed ahead of both compressor rotors. The lowering of the temperature is obviously due to the lack of heating of the carburetor since heating mechanism is not required to be provided therewith and also to the lowering of the temperature of the air compressed by the first rotor, the latter being due to the vaporization of the combustible as it is injected into the air which passes from the first rotor.

The invention and the disposition of the elements may be more particularly understood by reference to the drawing which, by the way, is to be considered only as exemplary and not as limitative and in which:

Fig. 1 is a more or less diagrammatic section of a two stage compressor together with means for injecting a combustible between the two stages.

Referring to the figure, the compressor comprises two rotors 1 and 2. The air enters the compressor through a volute 3 adjacent the first rotor, it being compressed, and by the intermediary of the compression conduit 4 is transferred through the nozzle 5 of a carburetor or the like means 6, to the volute 7 of the second rotor. The second rotor 2 works upon the charge introduced through 7, compresses it and at the same time thoroughly mixes and atomizes it and finally forces it through the discharge volute 8 into the motor.

It is to be particularly understood and borne in mind that the invention is in no wise limited to the particular description and figure set forth but only by the appended claims:

I claim:

1. In a charge forming mechanism for internal combustion engines, the combination of a shaft, a first centrifugal compressor having a rotor secured to said shaft, a second centrifugal compressor having a rotor secured to said shaft of less diameter than the first rotor, a passage connecting the compressors, and means for introducing a combustible to the passage, the inlet to the first stage compressor being arranged below the shaft, the outlet of the second stage compressor being arranged above the shaft, and both said inlet and said outlet being arranged to extend in the same general direction.

2. In a charge forming mechanism for internal combustion engines, the combination of a shaft, a first stage compressor having a rotor secured to said shaft, a second stage compressor of the centrifugal type having a rotor secured to said shaft of less diameter than the first rotor, a passage connecting the compressors, and means in the passage for introducing a combustible between the stages, the inlet to the first stage compressor and the outlet of the second stage compressor being vertically spaced and arranged on opposite sides of the shaft and extending in the same general direction.

CHARLES RAYMOND WASEIGE.